US010067579B2

(12) United States Patent
Hsu et al.

(10) Patent No.: US 10,067,579 B2
(45) Date of Patent: Sep. 4, 2018

(54) AMENDING CIRCUIT CAPABLE OF SWITCHING MOUSE INTO DIFFERENT DETECTING MODES

(71) Applicant: PixArt Imaging Inc., Hsin-Chu (TW)

(72) Inventors: Cheng-Seng Hsu, Hsin-Chu (TW); Jui-Te Chiu, Hsin-Chu (TW); Chung-Ting Yang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 375 days.

(21) Appl. No.: 14/877,942

(22) Filed: Oct. 8, 2015

(65) Prior Publication Data

US 2016/0124525 A1    May 5, 2016

(30) Foreign Application Priority Data

Oct. 29, 2014 (TW) .............................. 103137501 A
Sep. 2, 2015 (TW) .............................. 104128943 A (51) Int. Cl.
| | |
|---|---|
| *G06F 3/033* | (2013.01) |
| *G06F 3/038* | (2013.01) |
| *G06F 3/03* | (2006.01) |
| *G06F 3/0354* | (2013.01) |

(52) U.S. Cl.
CPC .......... *G06F 3/0383* (2013.01); *G06F 3/0317* (2013.01); *G06F 3/03543* (2013.01)

(58) Field of Classification Search
CPC ... G06F 3/0383; G06F 3/0317; G06F 3/03543
USPC ....................................................... 345/163
See application file for complete search history.

(56) References Cited

U.S. PATENT DOCUMENTS

| | | | |
|---|---|---|---|
| 6,252,584 B1 | 6/2001 | Wu | |
| 2003/0035568 A1* | 2/2003 | Mitev | G06F 1/1616 382/124 |
| 2005/0156887 A1* | 7/2005 | Chen | G06F 3/03543 345/163 |
| 2013/0050082 A1* | 2/2013 | Wu | G06F 3/017 345/163 |
| 2013/0057473 A1* | 3/2013 | Liang | G06F 3/038 345/163 |

FOREIGN PATENT DOCUMENTS

| | | |
|---|---|---|
| CA | 2 333 003 A1 | 12/1999 |
| CN | 1175823 A | 3/1998 |

* cited by examiner

*Primary Examiner* — Jonathan Blancha
(74) *Attorney, Agent, or Firm* — Winston Hsu (57) ABSTRACT

An amending circuit includes a comparing unit, a predetermined voltage generating unit, a roller switch, a light emitting unit switch and a controlling unit. A pin of the mouse and the predetermined voltage generating unit are respectively connected to two input terminals of the comparing unit. The controlling unit is coupled to the light emitting unit switch and the roller switch. The controlling unit switches to a motion detecting mode to drive a current of the current source to flow toward a second pin via the first pin and a light emitting unit of the mouse. The controlling unit further switches to a roller detecting mode to set a pressure of the first pin lower than a predetermined voltage of the predetermined voltage generating unit while the roller is grounded or to set the first pin higher than the predetermined voltage while the roller is not grounded.

12 Claims, 8 Drawing Sheets

AMENDING CIRCUIT CAPABLE OF SWITCHING MOUSE INTO DIFFERENT DETECTING MODES

BACKGROUND OF THE INVENTION

1. Field of the Invention

The present invention relates to an amending circuit, and more particularly, to an amending circuit capable of switching a mouse into different detecting modes.

2. Description of the Prior Art

An internal control circuit of the conventional mouse has eight pins to respectively control the button, the roller and the indicating light source. The button and the roller can be electrically connected with the same pin to decrease amounts of the pin and to economize material cost of the 6-pin mouse. As the single pin is shared among the button, the roller and the indicating light source, reference voltages of the roller and the button are unstable and cannot accurately design the related control circuit while a loading resistance of the indicating light source is an unknown value (or the resistance is uncertain due to low quality of the loading resistor). Therefore, design of an amend circuit capable of automatically amending reference voltages of the roller and the button which are coupled to the same pin according to the related loading resistance is an important issue in the mouse industry.

SUMMARY OF THE INVENTION

The present invention provides an amending circuit capable of switching a mouse into different detecting modes for solving above drawbacks.

According to the claimed invention, an amending circuit capable of switching a mouse into different detecting modes is disclosed. The mouse has a light emitting unit, a roller, a first pin and a second pin electrically connected with each other. The amending circuit includes a first comparing unit, a predetermined voltage generating unit, a first roller switch, a light emitting unit switch and a controlling unit. The first comparing unit includes a first input terminal, a second input terminal and an output terminal. The first input terminal is electrically connected to the first pin. The predetermined voltage generating unit is electrically connected to the second input terminal and adapted to generate a predetermined voltage. The first roller switch is disposed between a current source and the first pin. The light emitting unit switch is electrically connected to the first roller switch in parallel. The controlling unit is coupled to the first roller switch and the light emitting unit switch. The controlling unit switches to a motion detecting mode to switch on the light emitting unit switch and switch off the first roller switch, so as to drive a current of the current source to flow toward the second pin via the first pin and the light emitting unit. The controlling unit further switches to a roller detecting mode to switch off the light emitting unit switch and switch on the first roller switch, so as to set a pressure of the first pin lower than the predetermined voltage while the roller is grounded and higher than the predetermined voltage while the roller is not grounded. The output terminal is adapted to output a corresponding digital control code according to a comparison result of the first comparing unit in the roller detecting mode.

The amending circuit of the present invention can utilize the alternative scanning method to drive the two pins operated in the motion detecting mode and the roller detecting mode in a time-sharing manner, and utilizes the resistive voltage division and the built-in comparing unit to determine the detecting mode of the pins, so as to detect rotation of the roller while the pins are coupled to the light emitting unit. Further, the amending circuit of the present invention can determine the individual reference voltage of the mouse while the mouse is switched in the button detecting mode or in the roller detecting mode, the corresponding value of the individual reference voltage is stored for follow-up mode-switching application. Detecting modes of the mouse is switched by the alternative scanning method or the time-share scanning method. When the mouse is switched in the button detecting mode or in the roller detecting mode, the amending circuit can output the correct reference voltage through the memory unit for activation comparison. When the mouse is switched in the indicating light mode, comparing output of the amending circuit is neglected and the indicting light is directly emitted. The amending circuit further can store the corresponding mode comparison result by different roller operational states, and can automatically select the suitable comparing voltage according to the roller operational state (records of the storage unit) while the mouse is switched in the button detecting mode for accurate determination. Comparing to the prior art, the present invention shares the pin among several detecting components (such as the roller, the button and the LED), provides comparison ability to automatically acquire the reference voltage that the mouse needed in different detecting modes, so as to effectively economize packaging cost of the product and to increase precision of the signal detection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
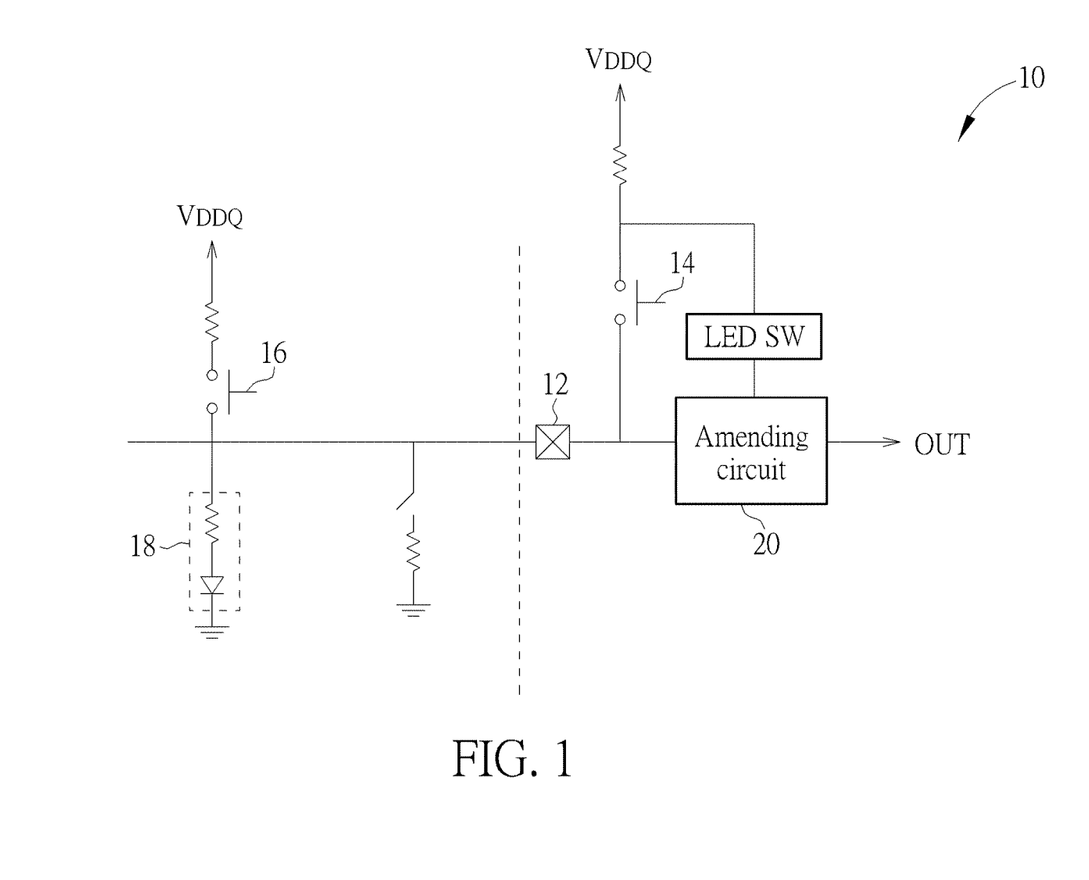
FIG. 1 is a diagram of an automatic amending system applied to a mouse according to an embodiment of the present invention.

Please refer to FIG. 1. FIG. 1 is a diagram of an automatic amending system 10 applied to a mouse according to an embodiment of the present invention. The automatic amending system 10 of the mouse includes a pin 12, a roller switch 14, a button switch 16, a loading resistor 18 and an amending circuit 20. The loading resistor 18 can be an internal resistor of a light emitting diode (LED) for an indicating light source of the mouse. The roller switch 14, the button switch 16 and the loading resistor 18 are electrically connected with each other to share the same pin 12, so as to decrease an amount of the pin and to economize material cost of the mouse. Due to share of the pin, the mouse can be switched between several detecting modes by an alternative scanning method or a time-share scanning method, to respectively acquire control signals of the roller switch 14, the button switch 16 and/or the loading resistor 18, and the automatic amending system 10 can detect the control signals of the roller switch 14 and the button switch 16 while the loading resistor 18 is coupled inside the mouse. Value of the loading resistor 18 is uncertain, so the automatic amending system 10 utilizes the amending circuit 20 to automatically adjust reference voltage of the mouse in different detecting modes, and the individual reference voltages suitable for different detecting modes are stored for next application.

For example, the mouse can be switched between three detecting modes. In the first detecting mode, the roller switch 14 is conductive (which means the roller switch 14 and the loading resistor 18 form a closed circuit) and the button switch 16 is non-conductive (which means the button switch 16 and the loading resistor 18 form an open circuit), and the amending circuit 20 acquires the reference voltage suitable for the first detecting mode to drive the mouse to output the correct control signal of the roller switch 14. In the second detecting mode, the roller switch 14 is non-conductive (which means the roller switch 14 and the loading resistor 18 form an open circuit) and the button switch 16 is conductive (which means the button switch 16 and the loading resistor 18 form a closed circuit), so the amending circuit 20 acquires the reference voltage suitable for the second detecting mode to drive the mouse to output the correct control signal of the button switch 16. In the third detecting mode, the automatic amending system 10 neglects output of the amending circuit 20 and directly generates indicating light by the loading resistor 18.

Figure 2:
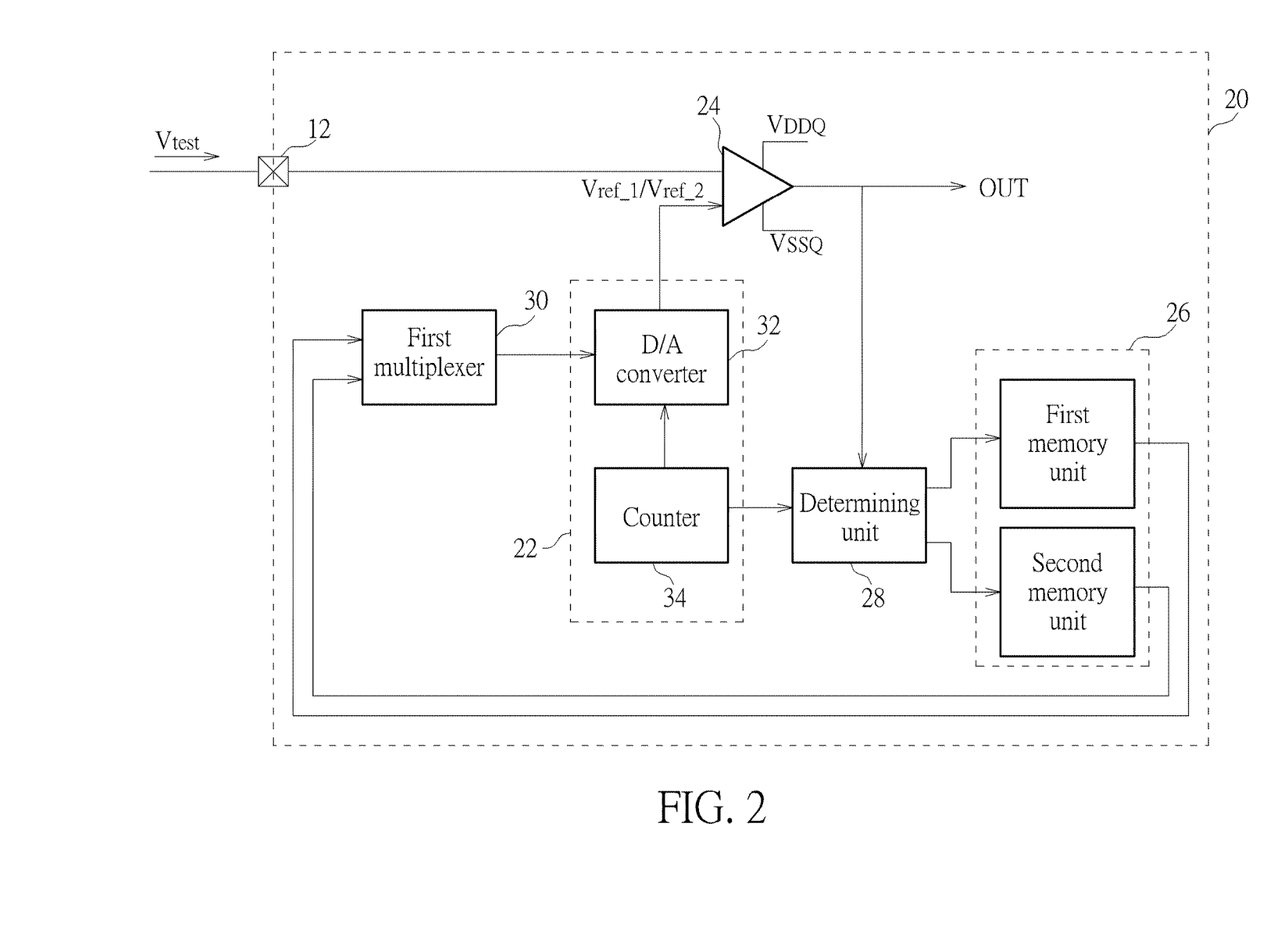
FIG. 2 is a functional block diagram of an amending circuit according to the embodiment of the present invention.
Figure 3:
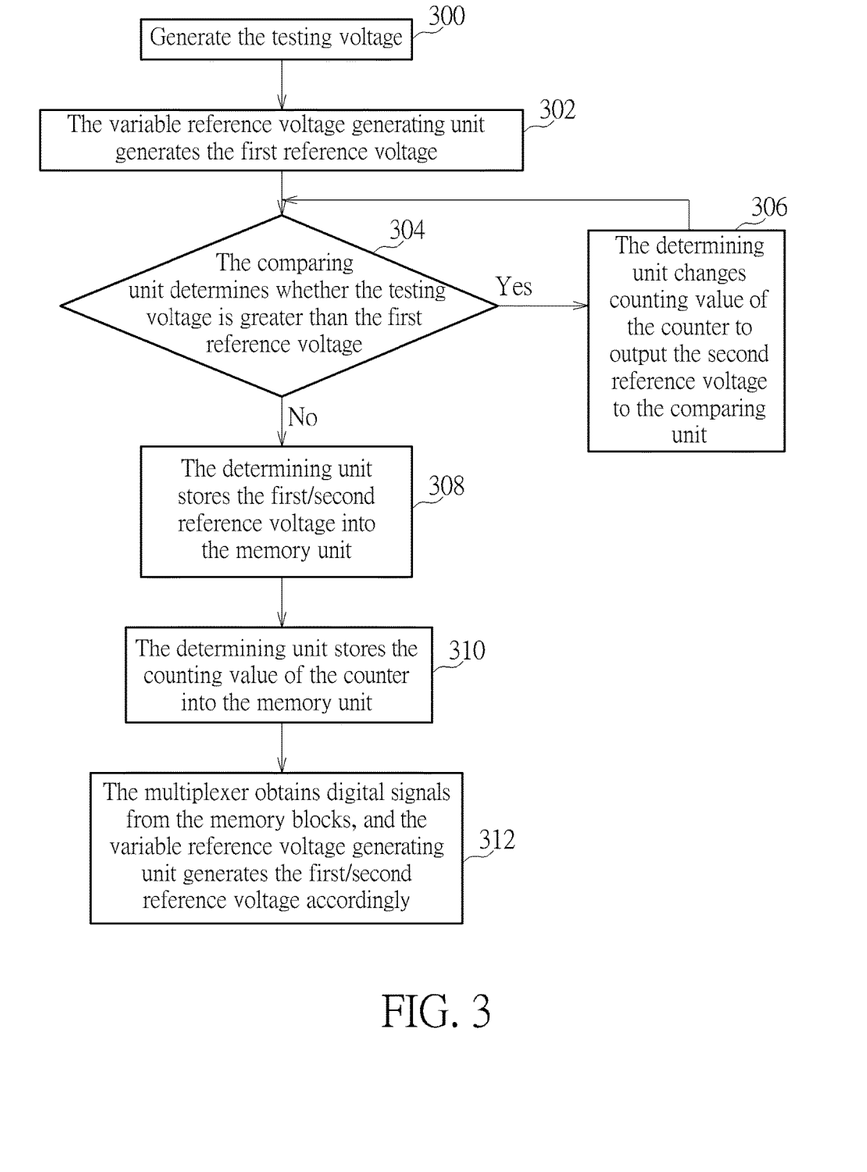
FIG. 3 is a flow chart of an amending method applied to the amending circuit according to the embodiment of the present invention.

Please refer to FIG. 2 and FIG. 3. FIG. 2 is a functional block diagram of the amending circuit 20 according to the embodiment of the present invention. FIG. 3 is a flow chart of an amending method applied to the amending circuit 20 according to the embodiment of the present invention. The amending circuit 20 includes a variable reference voltage generating unit 22, a comparing unit 24, a memory unit 26, a determining unit 28 and a first multiplexer 30. The variable reference voltage generating unit 22 preferably includes a digital-to analog (D/A) converter 32 and a counter 34. The reference voltage output by the D/A converter 32 is varied according to a counting value of the counter 34. The comparing unit 24 includes a first input terminal, a second input terminal and an output terminal. The first input terminal is electrically connected to the pin 12, the second input terminal is electrically connected to the D/A converter 32 of the variable reference voltage generating unit 22, and the output terminal is electrically connected to the determining unit 28. The memory unit 26 can be an eFuse controller or any kinds of memory, such as a random access memory (RAM) . The memory unit 26 can include a plurality of memory blocks according to an amount of the detecting mode, such as the first memory block 261 and the second memory block 262 respectively correspond to the first detecting mode and the second detecting mode. Further, the determining unit 28 is electrically connected between the variable reference voltage generating unit 22, the output terminal of the comparing unit 24 and the memory unit 26. The first multiplexer 30 is electrically connected between the variable reference voltage generating unit 22 and the memory unit 26.

The amending method shown in FIG. 3 is suitable for the automatic amending system 10 and the amending circuit 20 shown in FIG. 1 and FIG. 2. Step 300 is executed at first, the automatic amending system 10 generates the testing voltage Vtest at the pin 12, and a value of the testing voltage Vtest corresponds to the loading resistor 18. Step 302 to Step 304 are executed that the amending circuit 20 drives the variable reference voltage generating unit 22 to generate the primary first reference voltage Vref_1, the comparing unit 24 compares the testing voltage Vtest and the first reference voltage Vref_1 respectively from the first input terminal and the second input terminal, and then outputs a comparison result via the output terminal. While the present comparison result is the same as the former comparison result (which represents the testing voltage Vtest is greater than the first reference voltage Vref_1), the comparing unit 24 is not inverted, so Step 306 is executed to change the counting value of the counter 34 by the determining unit 28, and the D/A converter 32 outputs the second reference voltage Vref_2 to the comparing unit 24 according to the changed counting value. Then, step 304 can be executed again to compare the testing voltage Vtest with the second reference voltage Vref_2. While the present comparison result is not the same as the former comparison result (which represents the testing voltage Vtest is smaller than the first reference voltage Vref_1), the comparing unit 24 is inverted, the present reference voltage conforms to design demand, the variable reference voltage generating unit 22 does not work (which means the counter 34 does not count), and step 308 is executed that the determining unit 28 stores a corresponding value of the first reference voltage Vref_1 (or the adjusted second reference voltage Vref_2) into the memory unit 26. The corresponding value is a digital signal transformed from the analog reference voltage.

It should be mentioned that the amending circuit 20 can store the reference voltages that are acquired in different detecting modes into the corresponding memory blocks. For example, when the mouse is switched in the first detecting mode, the amending circuit 20 stores the corresponding digital signal of the first reference voltage Vref_1 (or the adjusted second reference voltage Vref_2) into the first memory block 261. When the mouse is switched in the second detecting mode, the amending circuit 20 stores the corresponding digital signal of the first reference voltage Vref_1 (or the adjusted second reference voltage Vref_2) into the second memory block 262. After the reference voltage is stored into the memory unit 26, step 310 is executed and the determining unit 28 stores the corresponding value (which is transformed from the counting value of the counter 34 by transform function) into the memory unit 26. The foresaid transform function is adding the counting value and a predetermined coefficient up or subtracting the counting value from the predetermined coefficient to acquire the corresponding value. Final, step 312 is executed that the first multiplexer 30 obtains the corresponding digital signal of the reference voltage alternatively from the memory blocks according to different detecting modes, and the variable reference voltage generating unit 22 can generate the corresponding first reference voltage Vref_1 (or the adjusted second reference voltage Vref_2) for application of the mouse.

Figure 4:
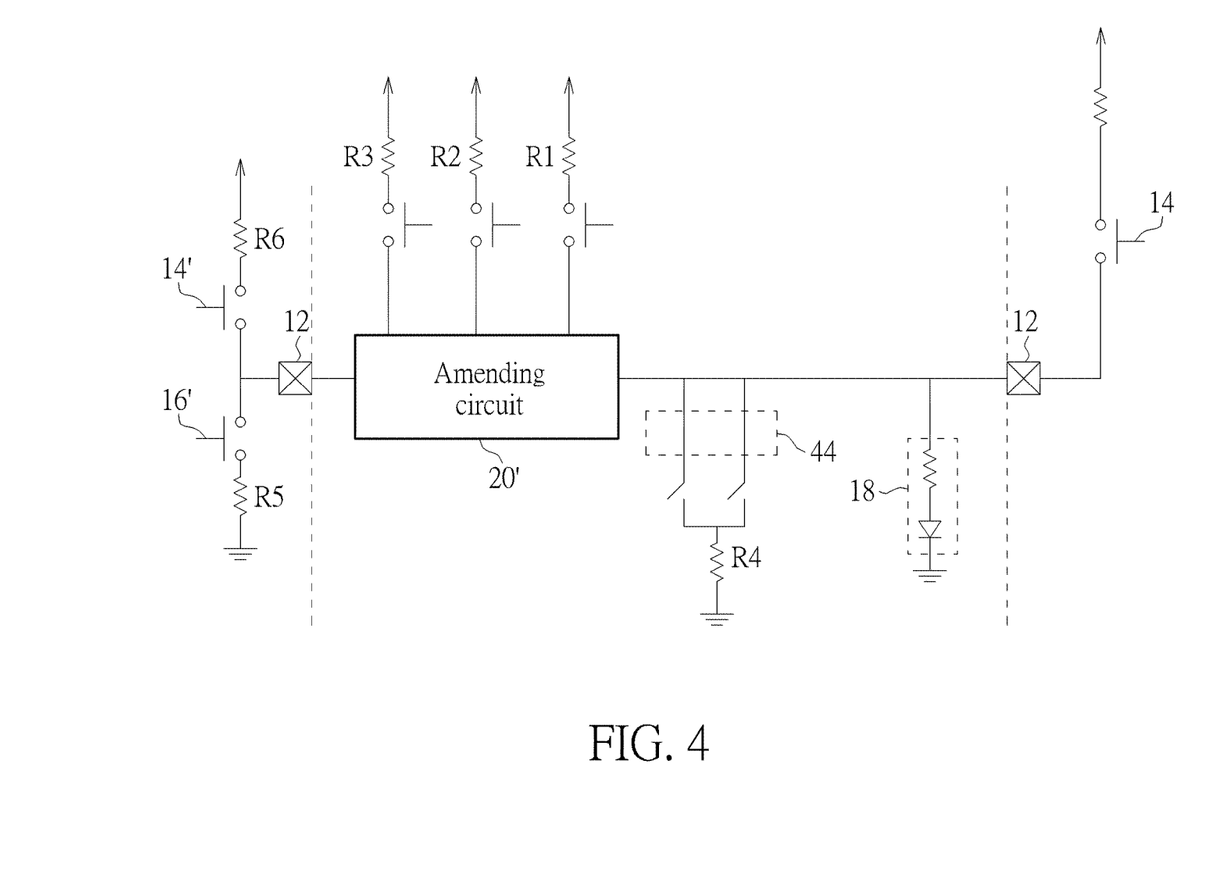
FIG. 4 is a circuit diagram of the mouse according to the embodiment of the present invention.
Figure 5:
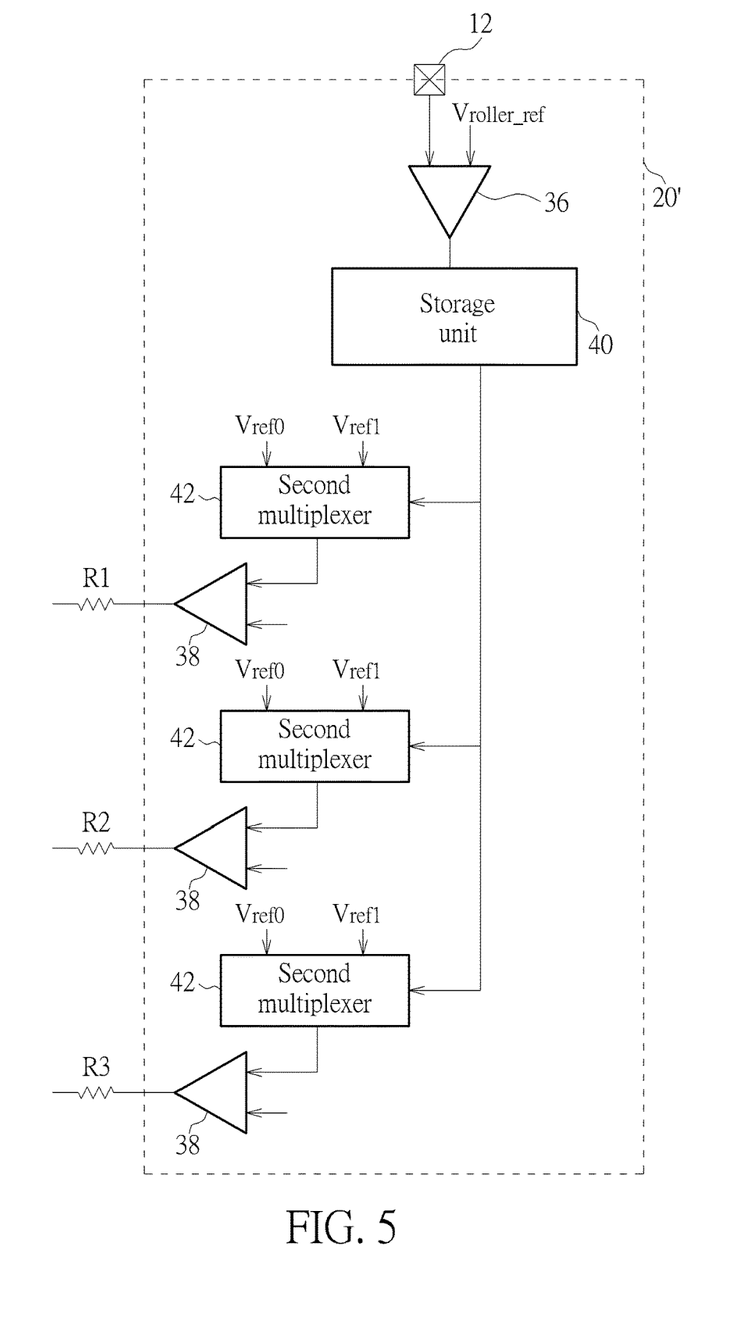
FIG. 5 is a diagram of the amending circuit according to another embodiment of the present invention.

Please refer to FIG. 4 and FIG. 5. FIG. 4 is a circuit diagram of the mouse according to the embodiment of the present invention. FIG. 5 is a diagram of the amending circuit 20' according to another embodiment of the present invention. Difference between the amending circuit 20' shown in FIG. 5 and the amending circuit 20 shown in FIG.

2 is: the amending circuit 20' further includes a roller comparing unit 36, a button comparing unit 38, a storage unit 40 and a second multiplexer 42. The roller comparing unit 36 is electrically connected to the pin 12, and the pin 12 can be the pin shown in FIG. 1, or another pin of the mouse. The storage unit 40 is electrically connected to the roller comparing unit 36 and the button comparing unit 38, and an amount of the button comparing unit 38 corresponds to a specification of the mouse (which means an amount of the button). The second multiplexer 42 is electrically connected between the storage unit 40 and the button comparing unit 38. When the mouse is switched in the roller detecting mode, the roller switch 14' is conductive to change the pin 12 into high potential level. The pin 12 can keep in the high potential level since the digital control code of the roller 44 is "00", voltage of the pin 12 is divided by the internal resistor R4, the external resistor R6 and the loading resistor 18 since the digital control code of the roller 44 is transferred to be "11". The roller comparing unit 36 respectively compares voltage division of the roller reference voltage Vroller_ref and the pin 12 since the roller 44 is switched in different operational states, and then stores the comparison result into the storage unit 40.

When the mouse is switched in the button detecting mode, the button switch 16' is conductive to change the pin 12 into low potential level, and voltage of the pin 12 is divided across the internal resistor R5 and the external resistors R1R2R3. In different operational states (which generates different digital control codes) of the roller 44, voltage division is varied according to connection between the loading resistor 18 and the external resistor R4. Thus, the second multiplexer 42 can acquire the comparison result of the roller comparing unit 36 from the storage unit 40, and select the suitable comparing voltage Vref0 or Vref1 from a plurality of the predetermined comparing voltages to generate the comparison result corresponding to activation of the button switch 16'. Parameters of inner electronic components of the mouse may be varied by design demand, and the roller reference voltage Vroller_ref and the comparing voltage Vref0 and Vref1 are measured through actual experiment.

Figure 6:
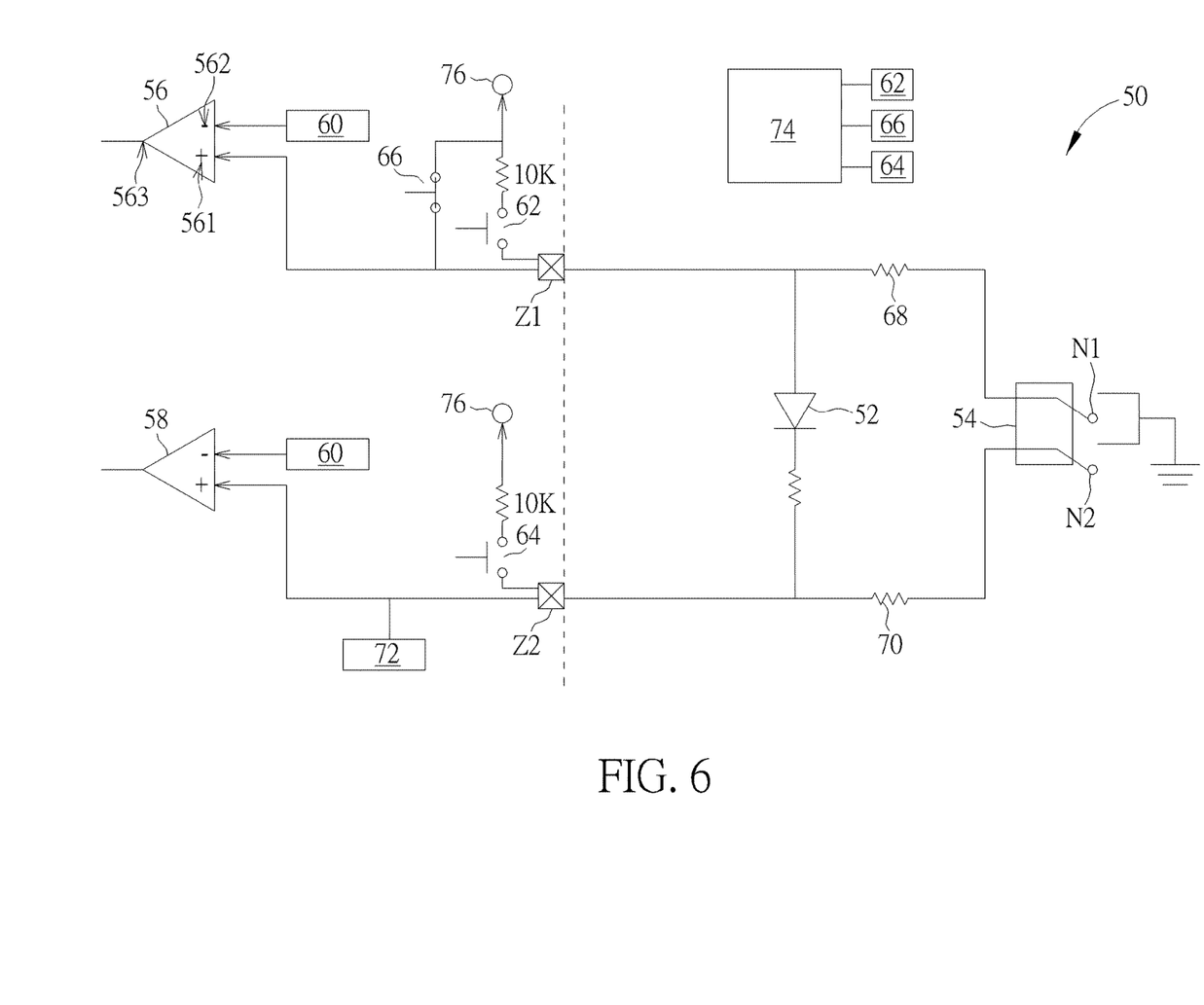
FIG. 6 and FIG. 7 respectively are diagrams of the amending circuit in different detecting modes according to another embodiment of the present invention.
Figure 7:
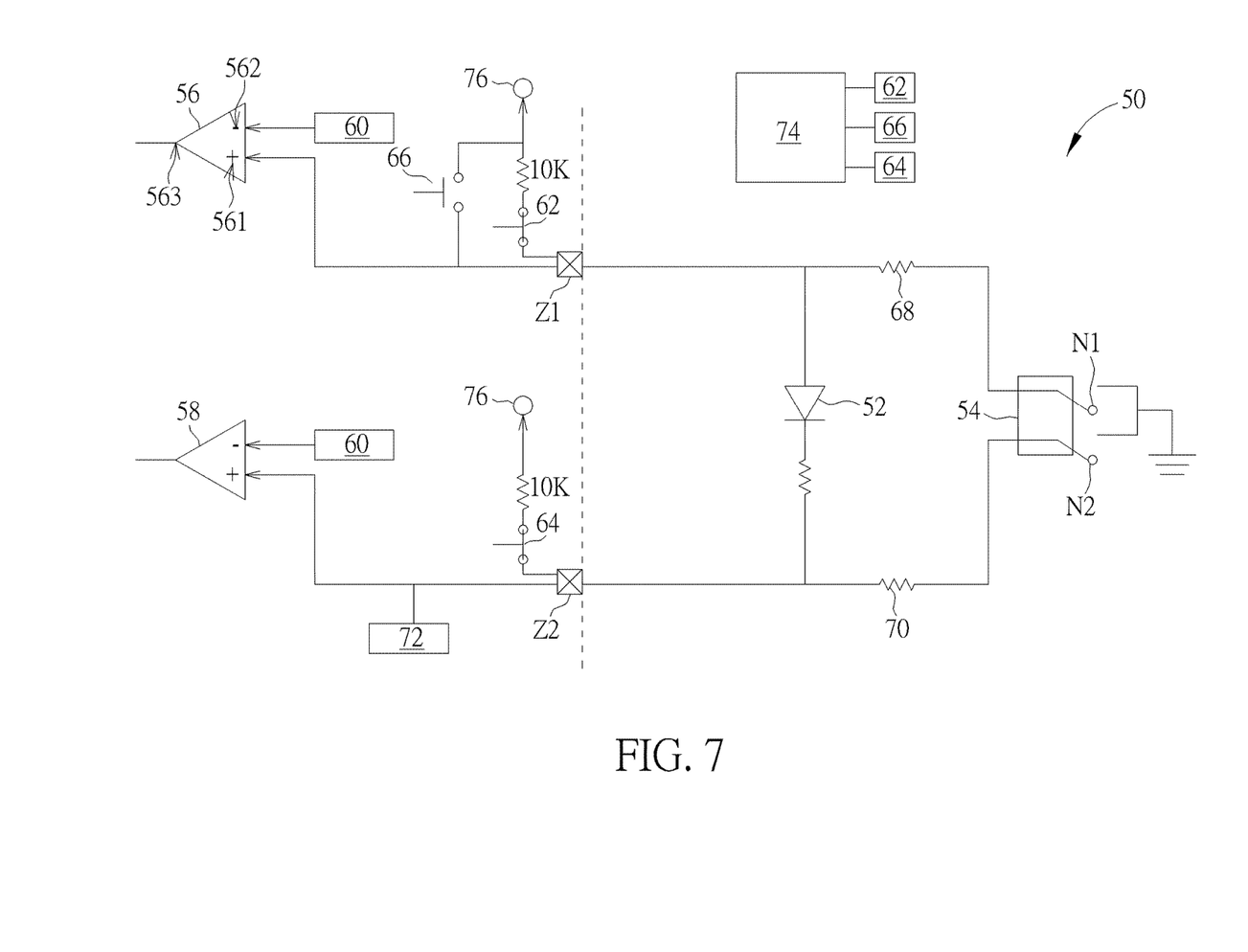

Please refer to FIG. 6 and FIG. 7. FIG. 6 and FIG. 7 respectively are diagrams of the amending circuit 50 in different detecting modes according to another embodiment of the present invention. The amending circuit 50 can be preferably applied to an optical mouse and the optical mouse can be arbitrarily switched between a motion detecting mode and a roller detecting mode by an alternative scanning method. The mouse includes a light emitting unit 52, a roller 54, a first pin Z1 and a second pin Z2 electrically connected with each other. The amending circuit 50 includes a first comparing unit 56, a second comparing unit 58, a predetermined voltage generating unit 60, a first roller switch 62, a second roller switch 64, a light emitting unit switch 66, a first impedance component 68, a second impedance component 70, a variable impedance unit 72 and a controlling unit 74.

The first comparing unit 56 has a first input terminal 561, a second input terminal 562 and an output terminal 563. The first input terminal 561 is electrically connected to the first pin Z1, and the second input terminal 562 is electrically connected to the predetermined voltage generating unit 60. The second comparing unit 58 is electrically connected to the predetermined voltage generating unit 60 and the second pin Z2. The first roller switch 62 is disposed between the current source 76 and the first pin Z1 and electrically connected to the controlling unit 74. The second roller switch 64 is disposed between the current source 76 and the second pin Z2 and electrically connected to the controlling unit 74. The light emitting unit switch 66 is electrically connected to the first roller switch 62 in parallel. The first impedance component 68 and the second impedance component 70 are electrically connected to the roller 54 in series, and further electrically connected to the first pin Z1 and the second pin Z2 respectively. The variable impedance unit 72 is electrically connected to the second pin Z2 and the controlling unit 74. The controlling unit 74 is coupled to the light emitting unit switch 66 and the first roller switch 62.

As the embodiment shown in FIG. 6, the controlling unit 74 switches to the motion detecting mode, the light emitting unit switch 66 is switched on, the first roller switch 62 and the second roller switch 64 are switched off, and the variable impedance unit 72 is turned on, so that a current of the current source 76 can flow toward the second pin Z2 through the first pin Z1 and the light emitting unit 52, and further flow toward the variable impedance unit 72 for grounding via the second pin Z2. It should be mentioned that impedance of the first impedance component 68 and the second impedance component 70 are preferably greater than a specific value, such as 20 k ohm, to constrain magnitude of the current passing through the first impedance component 68 and the second impedance component 70. The impedance of the first impedance component 68 and the second impedance component 70 may be identical or different with each other. Therefore, the light emitting unit 52 can output an optical detecting signal, and determine a movement of the mouse according the optical detecting signal reflected from an external object for motion detection. Due to variable impedance of the variable impedance unit 72, the controlling unit 74 can manually or automatically control impedance variation of the variable impedance unit 72 by user's command or predetermined algorithm, so as to adjust luminance of the light emitting unit 52 for energy economy. Output of the first comparing unit 56 and the second comparing unit 58 are omitted herein while the amending circuit 50 is in the motion detecting mode.

As the embodiment shown in FIG. 7, the controlling unit 74 switches to the roller detecting mode, the light emitting unit switch 66 is switched off, the first roller switch 62 and the second roller switch 64 are switched on, the variable impedance unit 72 is cutoff, and pressure of the first pin Z1 and the second pin Z2 are different while the roller 54 is grounded or not (which means the pressure of the pins Z1, Z2 are different by determining whether two modes N1, N2 are grounded). For example, the predetermined voltage generating unit 60 generates a predetermined voltage with a specific value, and the predetermined voltage is set as a threshold for pressure comparison between the first pin Z1 and the second pin Z2. As the two nodes N1, N2 of the roller 54 are not grounded, the pressures of the first pin Z1 and the second pin Z2 are in high potential and greater than the predetermined voltage, so the first comparing unit 56 and the second comparing unit 58 output a corresponding digital control code, such like "11". As the two nodes N1, N2 are grounded, the pressure of the first pin Z1 and the second pin Z2 are decreased and smaller than the predetermined voltage, the first comparing unit 56 and the second comparing unit 58 may output the corresponding digital control code, such like "00", for the roller control.

The two nodes N1, N2 are periodically grounded according to rotation of the roller 54. In order to distinguish rotary direction of the roller 54, the two nodes N1, N2 can be respectively grounded according to operational direction of the roller 54. For example, only the node N1 is actuated when the roller 54 is forward rotated so as to drive the first comparing unit 56 to output the digital control code, and only the node N2 is actuated when the roller 54 is backward rotated so as to drive the second comparing unit 58 to output the digital control code; further, the two nodes N1, N2 may be simultaneously grounded when the roller 54 is operated, and the two nodes N1, N2 has transient time difference between each other while being grounded according to operational direction of the roller 54, which means the roller 54 can be determined as forward rotation while the node N1 is grounded earlier than the node N2 and the roller 54 can be determined as backward rotation while the node N1 is grounded later than the node N2, so the control command applied to the roller 54 of the mouse can be accurately distinguished. Operation of the two nodes N1, N2 is not limited to the above-mentioned embodiments, and depends on design demand.

Figure 8:
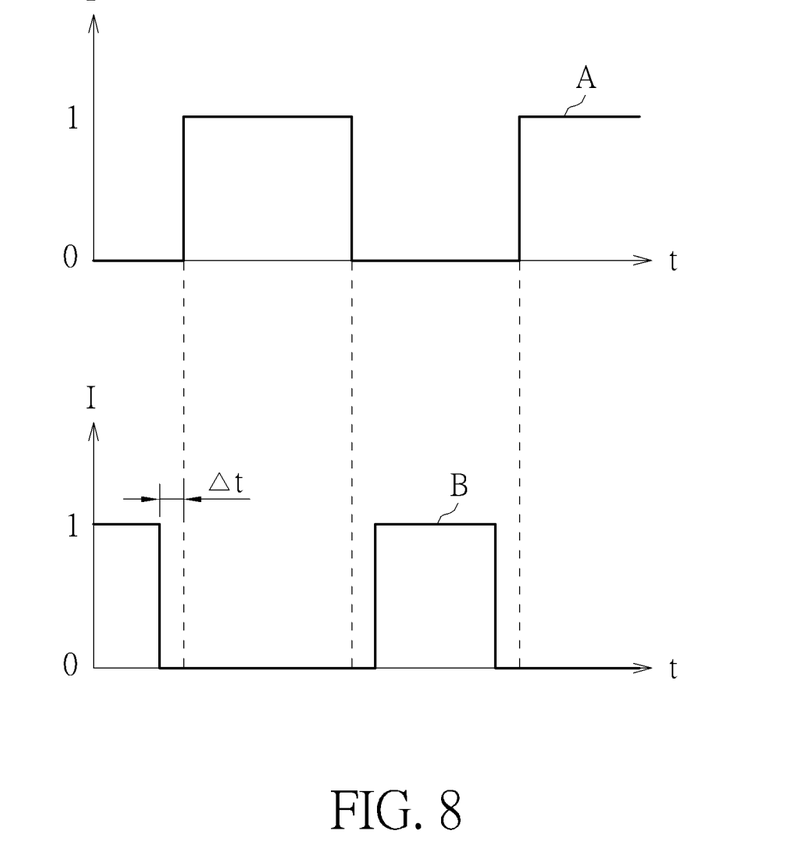
FIG. 8 is a wave comparison diagram of the roller switch and the light emitting unit switch according to the embodiment of the present invention.

Since the mouse is switched between the motion detecting mode and the roller detecting mode, actuating frequency of the first roller switch 62 and the second roller switch 64 is inverse to the actuating frequency of the light emitting unit switch 66, so that the light emitting unit 52 stops the motion detection while the roller switches 62, 64 are switched on for executing the roller control, or the nodes N1, N2 of the roller 54 do not affect output terminals of the comparing units 56, 58 while the light emitting unit switch 66 is switched on for executing the motion detection. Please refer to FIG. 8. FIG. 8 is a wave comparison diagram of the roller switch and the light emitting unit switch according to the embodiment of the present invention. An actuating signal of the first roller switch 62 (or the second roller switch 64) is defined as wave A, an actuating signal of the light emitting unit switch 66 is defined as wave B. As shown in FIG. 8, the wave A is inverse to, but almost synchronized as, the wave B. A tiny time difference between the wave A and the wave B is set during potential conversion of the actuating signal, such as the grounding time difference At marked in the figure, to prevent the roller switches 62, 64 and the light emitting unit switch 66 from being switched on simultaneously.

In conclusion, the amending circuit of the present invention can utilize the alternative scanning method to drive the two pins operated in the motion detecting mode and the roller detecting mode in a time-sharing manner, and utilizes the resistive voltage division and the built-in comparing unit to determine the detecting mode of the pins, so as to detect rotation of the roller while the pins are coupled to the light emitting unit. Further, the amending circuit of the present invention can determine the individual reference voltage of the mouse while the mouse is switched in the button detecting mode or in the roller detecting mode, the corresponding value of the individual reference voltage is stored for follow-up mode-switching application. Detecting modes of the mouse is switched by the alternative scanning method or the time-share scanning method. When the mouse is switched in the button detecting mode or in the roller detecting mode, the amending circuit can output the correct reference voltage through the memory unit for activation comparison. When the mouse is switched in the indicating light mode, comparing output of the amending circuit is neglected and the indicting light is directly emitted. The amending circuit further can store the corresponding mode comparison result by different roller operational states, and can automatically select the suitable comparing voltage according to the roller operational state (records of the storage unit) while the mouse is switched in the button detecting mode for accurate determination. Comparing to the prior art, the present invention shares the pin among several detecting components (such as the roller, the button and the LED), provides comparison ability to automatically acquire the reference voltage that the mouse needed in different detecting modes, so as to effectively economize packaging cost of the product and to increase precision of the signal detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An amending circuit capable of switching a mouse into different detecting modes, the mouse having a light emitting unit, a roller, a first pin and a second pin electrically connected with each other, the amending circuit comprising:
   a first comparing unit, comprising a first input terminal, a second input terminal and an output terminal, the first input terminal being electrically connected to the first pin;
   a predetermined voltage generating unit electrically connected to the second input terminal and adapted to generate a predetermined voltage;
   a first roller switch disposed between a current source and the first pin;
   a light emitting unit switch electrically connected to the first roller switch in parallel; and
   a controlling unit coupled to the first roller switch and the light emitting unit switch, the controlling unit switching to a motion detecting mode to switch on the light emitting unit switch and switch off the first roller switch so as to drive a current of the current source to flow toward the second pin via the first pin and the light emitting unit, the controlling unit further switching to a roller detecting mode to switch off the light emitting unit switch and switch on the first roller switch so as to set a pressure of the first pin lower than the predetermined voltage while the roller is grounded and to set the pressure of the first pin higher than the predetermined voltage while the roller is not grounded, and the output terminal being adapted to output a corresponding digital control code according to a comparison result of the first comparing unit in the roller detecting mode.

2. The amending circuit of claim 1, further comprising:
   a first impedance component electrically connected to the roller in series and electrically connected to the first pin, impedance of the first impedance component being greater than a specific value to constrain magnitude of the current grounded via the first impedance component.

3. The amending circuit of claim 2, further comprising:
   a second impedance component electrically connected to the roller in series and electrically connected to the second pin, impedance of the second impedance component being substantially equal to the impedance of the first impedance component.

4. The amending circuit of claim 1, wherein an actuating period of the first roller switch and an actuating period of the light emitting unit switch are in reversed phase.

5. The amending circuit of claim 1, further comprising:
   a variable impedance unit electrically connected to the second pin and the controlling unit, the controlling unit being connected to the variable impedance unit while switching to the motion detecting mode, and the current of the current source is grounded from the second pin to the variable impedance unit.

6. The amending circuit of claim 5, wherein the controlling unit further controls impedance variation of the variable impedance unit to adjust luminance of the light emitting unit.

7. The amending circuit of claim 5, wherein the controlling unit switches to the roller detecting mode to cutoff the variable impedance unit.

8. The amending circuit of claim 1, further comprising:
a second comparing unit electrically connected to the predetermined voltage generating unit and the second pin; and
a second roller switch electrically connected to the controlling unit and disposed between the current source and the second pin, the controlling unit switching to the roller detecting mode to switch on the second roller switch so as to set a pressure of the second pin lower than the predetermined voltage while the roller is grounded and to set the pressure of the second pin higher than the predetermined voltage while the roller is not grounded, and the second comparing unit being adapted to output a corresponding digital control code according to a comparison result of the second comparing unit.

9. The amending circuit of claim 8, wherein the controlling unit switches to the motion detecting mode to cutoff the second roller switch.

10. The amending circuit of claim 1, wherein two nodes of the roller are simultaneously grounded while the roller is operated, and the two nodes has transient time difference between each other while being grounded according to operational direction of the roller.

11. The amending circuit of claim 1, wherein two nodes of the roller are respectively grounded according to operational direction of the roller.

12. The amending circuit of claim 1, wherein the mouse is switched between the motion detecting mode and the roller detecting mode by an alternative scanning method.

* * * * *